United States Patent [19]

Krajewski et al.

[11] 4,200,671

[45] Apr. 29, 1980

[54] METHOD FOR REMOVING PAINT FROM A SUBSTRATE

[75] Inventors: Richard M. Krajewski, St. Louis; Robert E. Erickson, Midland, both of Mich.

[73] Assignee: The Dow Chemical Company, Midland, Mich.

[21] Appl. No.: 903,285

[22] Filed: May 5, 1978

[51] Int. Cl.² ............................................... B08B 7/00
[52] U.S. Cl. ....................................... 427/154; 134/4; 427/155; 427/156; 134/38
[58] Field of Search ..................... 134/2, 4, 38, 26; 427/154, 155, 156

[56] References Cited

U.S. PATENT DOCUMENTS

| T896,032 | 3/1972 | Gordy | 427/156 |
|---|---|---|---|
| 1,862,392 | 6/1932 | Affleck | 134/38 |
| 2,563,499 | 8/1951 | Smith | 134/4 |
| 3,201,274 | 8/1965 | Hobbs | 427/156 |
| 3,531,311 | 9/1970 | Prior | 134/4 |
| 3,669,103 | 6/1972 | Harper | 128/156 |
| 3,687,701 | 8/1972 | Reinhart | 117/6 |
| 3,810,468 | 5/1974 | Harper | 128/156 |
| 3,846,172 | 11/1974 | Fossati | 134/4 |
| 3,926,891 | 12/1975 | Gross | 260/29.6 E |
| 4,061,846 | 12/1977 | Gross | 526/16 |
| 4,071,639 | 1/1978 | Palmer | 427/156 |

FOREIGN PATENT DOCUMENTS

| 4617893 | 12/1967 | Japan | 427/156 |
|---|---|---|---|
| 903675 | 9/1959 | United Kingdom | 427/156 |

OTHER PUBLICATIONS

"Strippable Coatings", Fabian, R. J., Materials in Design Engineering, May 1959, pp. 110–115.
"Strippable Coatings", Chandhok, Y. M. et al., Paint Manufacture, Jul. 1970, vol. 40, #7, pp. 35–37.

*Primary Examiner*—Joseph Scovronek
*Assistant Examiner*—Chris Konkol

[57] ABSTRACT

Hydrophobic materials deposited on the surface of a substrate having a primer release coating of a water-insoluble, water-swellable polymer can easily be removed from the substrate upon exposure of the water-swellable polymer to an aqueous liquid. For example, paint applied to the surface of a steel panel precoated with a lightly cross-linked polyacrylate can easily be removed upon the immersion of the panel in water.

8 Claims, No Drawings

METHOD FOR REMOVING PAINT FROM A SUBSTRATE

BACKGROUND OF THE INVENTION

This invention relates to methods for removing hydrophobic deposits from a substrate.

In painting processes, especially those using spray application techniques, large quantities of paint are often deposited on the walls and floors in the painting area. Upon accumulation, these deposits tend to block floor grates and exhaust stacks thereby creating a safety hazard. Thus, the floor grates and exhaust stacks must be cleaned frequently and at regular intervals.

Conventionally, cleaning of such paint deposits has been performed by various mechanical separation means such as peeling, scraping, brushing or melting the paint from the substrate or by chemical means such as alkali or solvent cleaning. However, due to expense and man hours required for mechanical separation, it is generally inefficient for cleaning large areas. On the other hand, chemical cleaning methods are generally hazardous, e.g., require working with highly caustic solutions at high temperatures, and often damage the substrate being cleaned.

In an attempt to overcome many of the problems associated with mechanical and chemical methods of paint removal, it has been a common practice to apply a primer release coating to the substrate prior to paint deposition. The primer release coating operates as an interface between the substrate and the paint and facilitates the removal of the paint therefrom. Thus, effective primer release coatings generally have high cohesive strengths, poor adhesion and are easily removed from the substrate.

Heretofore, several methods of paint removal employing such primer release coatings have been proposed. For example, due to their poor adhesion to many substrates, ethyl cellulose, cellulose acetate butyrate or a vinyl polymer such as polyvinyl butyral have been proposed as primer release coatings. See, for example, *Paint Manufacture*, Volume 40, No. 7, Y. M. Chandhok and S. N. Agarwal, "Strippable Coatings", pages 35-37. Unfortunately, these primer release coatings, and the paint deposited thereon, are necessarily removed from the substrate by mechanical stripping. Thus, paint removal employing such primer release coatings is unsuited for removing paint from intricate structures such as floor grates and for cleaning large areas.

Alternatively, methods for removing paint employing water-soluble primer release coatings have been proposed. For example, U.S. Pat. No. 1,862,392 describes a method of paint removal wherein a primer release coating comprised primarily of pigment, sulphonated castor oil, glycerine, mineral oil, water and alcohol is employed. Similarly, other water-soluble materials such as an alkali metal hypophosphate have also been disclosed as primer release coatings. See U.S. Pat. No. 3,846,172. Unfortunately, removal of paint deposited on these coatings requires steam or hot water, e.g., 70° to 95° C. Moreover, the removal of these coatings proceeds slowly, making these methods impractical for cleaning large areas.

In view of the stated deficiencies of the known methods for removing paint from a substrate, it remains highly desirable to provide a method for effectively removing paint from a substrate using a water wash.

SUMMARY OF THE INVENTION

Accordingly, one aspect of the present invention is such an improved method involving the use of a water-insoluble, water-swellable polymer as an improved primer release coating which facilitates the removal of hydrophobic materials from a substrate. This method for removing hydrophobic deposits from a substrate comprises applying the primer release coating to the substrate followed by the deposition of a hydrophobic material thereon. The hydrophobic material on said coating is loosened by exposing the primer release coating to excessive amounts of an aqueous liquid which loosened material is then easily removed. In another aspect, this invention is a normally water-insoluble substrate coated with the primer release coating on which coating is deposited a hydrophobic material.

Surprisingly, the removal of the loosened hydrophobic material is easily accomplished upon its exposure to a mild force. For example, a stream of water at moderate pressures, e.g., 1–5 Kg/cm$^2$ (kilogram force per square centimeter), mild agitation in a bath of the aqueous liquid or gravitational forces are generally sufficient to remove the hydrophobic material. Moreover, such removal of the hydrophobic material is essentially complete, thereby eliminating the need for any mechanical separation means such as scraping or brushing.

The method of this invention is useful for removing paints, lacquers, finishes and the like from a variety of different substrates such as metal, glass or tile.

DETAILED DESCRIPTION OF THE PREFERRED EMBODIMENTS

For the purposes of this invention, a substrate is any normally solid material on whose surface the primer release coating as hereinafter described is applied. Such substrate has sufficient strength characteristics such that its integrity is not affected by the swelling of the primer release coating upon the coating's exposure to an aqueous liquid. Advantageously, such substrates are essentially insoluble in water, i.e., essentially none of the substrate forms a true solution in water. Representative examples of such substrates include metals such as aluminum, zinc, copper or steel; glass and glass substitutes such as polymethyl methacrylate; plastics such as polystyrene, polyurethane, acrylic polymers, phenolic resins, polyethylene, and epoxy resins; tile and the like.

By the term "primer release coating" it is meant any coating material which acts as an interface between a hydrophobic material and a substrate and facilitates the removal of the hydrophobic material from the substrate. In this invention, the primer release coating is a coating of a water-insoluble, water-swellable polymer. Water-insoluble, water-swellable polymers are polymers having sufficient hydrophilic properties to absorb and hold water therein, but which do not form a true solution in water, i.e., essentially none of the individual polymer molecules are disassociated from the bulk of the polymer when immersed in water. Advantageously, such polymers are capable of absorbing more than about 25 times, preferably more than about 50 times, their original, unswelled weight in water, with a comparable increase in volume. Preferably, upon absorption of these amounts of water, the polymer exhibits a gel-like consistency which is easily broken apart by cold water, e.g., 20° to 40° C., at moderate pressure, e.g., 1 to 5 Kg/cm$^2$.

Generally, such primer release coatings are derived from lightly cross-linkable polymers prepared by copolymerizing one or more water-soluble monomers, e.g., monomers which can form at least a 5 weight percent solution in water with a small amount of a polyfunctional cross-linking agent. These cross-linkable polymers are lightly cross-linked to a degree sufficient that the resulting lightly cross-linked polymers are water-insoluble but water-swellable. Typically, suitably employed polymers are copolymers of one or more vinyl monomers, wherein at least 50 mole percent of such monomers are water-soluble, with about 0.01 to about 10 mole percent of a cross-linking agent. Optionally, a comparable degree of radiation-cure can be effectively employed. Alternatively, a cross-linkable polymer composition comprising the (co)polymerizate of said water-soluble monomer(s) mixed with from about 0.1 to about 10 weight percent of a polyfunctional cross-linking agent based on the polymer weight is lightly cross-linked to form the primer release coating. In yet another procedure, certain water-insoluble polymers, such as olefin-maleic anhydride copolymers, may be lightly cross-linked with an alkylene diamine or aliphatic diol and thereafter converted to an ammonium or alkali metal salt form to obtain the desired water-insoluble, water-swellable polymer.

Representative examples of lightly cross-linked polymers suitably employed in this invention include lightly cross-linked polymers of vinylpyrrolidone, vinylbenzene sulfonates, sulfoethyl acrylates or methacrylates, hydroxyalkyl acrylates, acrylic or methacrylic acids, acrylamide, methacrylamide, and the like and combinations thereof. Also suitably employed are the N-aminomethyl form (Mannich form) of polyacrylamide and the like, and the quaternized derivative of the Mannich derivative of polyacrylamide and the like.

Preferred lightly cross-linked polymers are lightly cross-linked polyacrylates prepared in accordance with the teaching of U.S. Pat. No. 3,926,891; the polymeric sorbents disclosed by U.S. Pat. No. 3,669,103; and the sorbent substances of U.S. Pat. No. 3,810,468, all of which are hereby incorporated by reference.

U.S. Pat. No. 3,926,891 teaches a method of making soft, absorbent, lightly cross-linked polyacrylate materials. Briefly summarized, the polyacrylates are prepared by saponifying an aqueous solution comprising (1) between about 30 to about 70 weight percent of a polyacrylate comprising (a) from about 30 to about 92 weight percent of an alkyl acrylate having 1–10 carbon atoms in the alkyl group or an alkyl methacrylate having 4–10 carbon atoms in the alkyl group, or mixtures thereof, (b) about 3 to about 70 percent of an olefinically unsaturated carboxylic acid, and (c) about 0 to about 15 percent of an omega hydroxyalkyl acrylate having 1–4 carbon atoms in the hydroxyalkyl group; and (2) an alkali metal hydroxide, at a concentration sufficient to saponify some of the acrylate esters and to neutralize the carboxylic acid groups. Following saponification, from about 0.1 to about 10 weight percent based on dissolved polymer of a water-soluble cross-linking agent which is reactive with carboxylate salt groups is added. The resulting cross-linkable polymer composition may then be lightly cross-linked to form a water-insoluble, water-swellable polymer.

U.S. Pat. No. 3,669,103 describes various lightly cross-linked polymers including polyvinylpyrrolidones, sulfonated polystyrenes, sulfonated polyvinyl toluenes, polysulfoethyl acrylates, poly-2-hydroxyethyl acrylates, polyacrylates, hydrolyzed polyacrylamides and copolymers of acrylamides with acrylic acid. U.S. Pat. No. 3,810,468 describes other lightly cross-linked, water-swellable, water-insoluble polymeric sorbents including polyvinyl morpholinone; amides and alkali metal or ammonium salts derived from copolymers of maleic anhydride with vinyl methylether, with vinyl pyrrolidone, with vinyl morpholinone, or with mono-olefinic hydrocarbons; polymers and copolymers of acrolein modified by the reaction with an alkali metal hydroxide or alkali metal bisulfite and copolymers of sulfur dioxide with allyl alcohol, allyl ether of glycerol or allyl ether of ethylene glycol or a polyethylene glycol.

Especially preferred are the lightly cross-linked polyacrylates prepared in accordance with the methods disclosed in U.S. Pat. No. 3,926,891.

In the practice of this invention, the primer release coating is applied to the substrate prior to the deposition of the hydrophobic material. In general, the primer release coatings are prepared by conventional techniques. For example, a solution of the cross-linkable polymer or polymer composition, useful for preparing a lightly cross-linked, water-insoluble, water-swellable polymer is advantageously applied to a substrate by conventional coating techniques such as spraying, brushing or the like. Advantageously, such solution is an aqueous solution comprising from about 10 to about 20 weight percent of the polymer. The remainder of the aqueous solution comprises water; any other adjuncts necessary to cross-link the polymer, e.g., catalysts, cross-linking agents or the like, and other optional adjuncts such as surfactants and the like. Other suitable solvents, i.e., those in which the polymer to be cross-linked and other adjuncts are soluble, can also be employed in this invention although these other solvents are less preferable than water.

The cross-linkable polymer or polymer composition thus applied is then subjected to temperatures sufficient to lightly cross-link the polymer and drive off any volatiles, e.g., water. Such cross-linking conditions, i.e., curing conditions, are dependent on various factors, including the type of polymer, the type and concentration of the cross-linking agent and the desired degree of cross-linking. Generally, an ambient temperature cure, i.e., about 20° to about 30° C. is sufficient to lightly cross-link the polymers. At such temperatures, the polymer is sufficiently cross-linked to a water-insoluble, water-swellable polymer in about 24 to about 48 hours. Advantageously, higher temperatures are employed to reduce the time required to lightly cross-link the polymer. Beneficially, such higher temperatures are from about 100° to about 150° C. At these temperatures the cross-linkable polymers are sufficiently cross-linked in about 1 to about 15 minutes to form the desired water-insoluble, water-swellable polymer. Where possible, it proves advantageous to pre-heat the substrate to be coated to the desired curing temperature prior to applying the cross-linkable polymer composition. The polymer composition is then applied to the pre-heated substrate and cured at the elevated temperature or as the substrate cools.

The water-insoluble, water-swellable polymer thus applied to the substrate is advantageously a sufficiently thick coating to provide resistance to penetration of the hydrophobic material thereafter deposited and prevent effective contact between the hydrophobic deposits and the substrate, i.e., the hydrophobic material does not directly contact the substrate to any extent. Moreover, such thickness is beneficially sufficient to loosen the accumulated hydrophobic deposits upon the exposure of the water-insoluble, water-swellable polymer to excessive amounts of an aqueous liquid, i.e., amounts in excess of those which the water-insoluble, water-swellable polymer can absorb. Such thickness will vary depending on various factors, including the type of water-insoluble, water-swellable polymer employed, the type of hydrophobic material deposited and the amount of deposition of said hydrophobic material prior to removal. Generally, a primer release coating from about 0.002 to about 0.25 millimeter, preferably from about 0.01 to about 0.05 millimeter is advantageously employed. Such thicknesses are beneficially applied to all surfaces of the substrate which will be exposed to the hydrophobic material.

Following the application of the primer release coating to the substrate, the coated substrate is now ready for use in a paint chamber, exhaust stacks or the like. At this time, the hydrophobic material is deposited to the substrate's coated surface(s). The method of deposition and type of hydrophobic material are not critical to the practice of this invention. Hydrophobic materials which can be effectively removed by the method presented herein include any essentially water-insoluble material which can adhere to one or more substrates as defined above upon exposure to a stream of cold water, e.g., 20°–40° C., at moderate pressures, e.g., 1–5 Kg/cm$^2$. Representative of such water-insoluble materials include paints such as emulsion paints, inorganic paints, metallic paints; lacquers such as nitrocellulose lacquer or nitrocellulose-alkyd lacquer; varnishes; protective plastic materials such as polyethylene; polyvinylchloride; polyacrylates including polymers and copolymers of acrylic acid, methacrylic acid, esters of these acids, and acrylonitrile; and the like.

Accumulations or depositions of such hydrophobic materials on the primer release coating are loosened upon exposure of the primer release coating to excessive amounts of water. In a typical application the primer release coating is loosened therewith, although such is not critical to the practice of this invention. As used herein, the term "loosen" refers to the loss of adhesion exhibited upon the swelling of the water-insoluble, water-swellable polymer. In this invention, the hydrophobic material or primer release coating is loosened when it can be removed from the substrate by the pressure exerted by a stream of water exiting from a 1.92 centimeter diameter hose at pressures from about 1 to about 5 Kg/cm$^2$. Such loosening is generally evidenced by the lifting or blister-like appearance in the loosened areas.

Water to which the coating is exposed is advantageously at any temperature between about 10° and about 100° C., with temperature between about 20° and about 60° C. being preferred for loosening of the hydrophobic deposits in most applications. Any conventional technique of water washing such as immersing the coated substrate in a tank containing excessive amounts of water or subjecting the coated substrate to a stream of excessive amounts of water is effectively employed to loosen the deposits provided at least a portion of the primer release coating is exposed to the water. Although the accumulated deposits are loosened when as little as 0.1 percent of the surface area of the primer release coating is exposed to said water wash, preferably; for effective and rapid removal of said deposits, at least about 1 percent, more preferably at least about 2 percent, of the surface area of the primer release coating is exposed to said water. In many applications, the end portions of the primer release coating will not be covered by the deposits of the hydrophobic material. These uncovered end portions generally provide sufficient exposure of the primer release coating for loosening of the accumulated deposits. In other cases, the accumulated deposits may be sufficiently discontinuous to provide the necessary exposure of the primer release coating. In cases where the primer release coating is completely covered with the hydrophobic material, i.e., none of the primer release coating is exposed to water, sufficient exposure of the primer release coating is easily accomplished by scratching through the hydrophobic deposit using a knife, scraper or other similar means. Alternatively, a spray comprising a mixture of water and an abrasive particulate such as sand may be used as a means of exposing the primer release coating to water, i.e., scratching through the hydrophobic deposits. Scratching through the hydrophobic material to the primer release coating is also desirable to provide more rapid loosening of the hydrophobic material in cases where the primer release coating is not completely covered with the hydropobic material. The loosened hydrophobic material is subsequently removed from the substrate by subjecting it to a mild force such as gravitational forces, the force exerted by a stream of water exiting from a hose at moderate pressures, e.g., 1–5 Kg/cm$^2$ or the force provided by mild agitation in a bath of an aqueous liquid in which the substrate is immersed. Although not essential to the practice of this invention, in a typical application, the removal of the hydrophobic material removes essentially all the primer release coating therewith.

The following examples are set forth to illustrate the invention and should not be construed to limit its scope. In the examples, all parts and percentages are by weight unless otherwise indicated.

EXAMPLE 1

Three mixtures are prepared having the following concentration of the named ingredients:

| MIXTURE A | MIXTURE B | MIXTURE C |
|---|---|---|
| 600 parts deionized water | 437.5 parts ethyl acrylate | 175 parts deionized water |
| 0.75 part dioctyl-sodium sulfosuccinate | 77.2 parts methacrylic acid | 2.0 parts sodium bisulfite |
| 1.75 parts sodium persulfate | | |

To a 2 l. flask equipped with a thermocouple, thermometer, stirrer, heating device and addition funnel is added Mixture A. The flask is then brought to a temperature of 40° C. while under a vigorous nitrogen purge. Eighteen parts of Mixture B are added to the flask followed by the addition of all of Mixture C. The remainder of Mixture B is added over the next 2.5 hours, while the temperature is held at 30°–40° C. The latex is then digested at 60° C. for 1.5 hours, the flask cooled to about 30° C. and the latex bottled. The latex contains about 40.6 percent non-volatiles.

An 1125-part portion of the above latex is added in a small stream over a period of 25 minutes to a slowly stirred solution of 187.2 parts 50 percent NaOH in 547.9 parts deionized water. After the polymer has all dissolved, the viscous solution is heated at 50° C. for 22 hours to complete the saponification. The resulting solution (25.4 percent solids) has a Brookfield viscosity of about 16,200 cps at 25° C. (RVT Type, No. 5 spindle, 10 rpm). The polymer is 50 percent ethyl acrylate by moles with the remainder being sodium acrylate and methacrylate. The resulting product is denoted Preparation I in the following table and examples.

A cross-linkable polymer composition useful for preparing a water-insoluble, water-swellable polymer is prepared by mixing the following ingredients:

|  | Parts dry weight | Parts wet weight |
|---|---|---|
| Preparation I | 94 | 364.4 |
| Polyoxyethylene sorbitan mono laurate | 5 | 5.0 |
| Polycup 172* (diluted 2:1 with water) | 1 | 24.0 |
| Distilled water | — | 340.0 |

*A liquid adduct of epichlorohydrin and a polyamide-polyamine having about 12.5 percent solids, pH 4.6–4.9 and about 12.8 percent nitrogen which is sold by Hercules, Inc.

The resulting mixture is applied to four 10 centimeter by 30 centimeter Bonderite ® 37 metal panels, (Panels A-D) which are preheated to about 120° C. Thicknesses of such coating are sufficient to provide a dry thickness of between about 0.01 to about 0.25 millimeter and such that the entire panel is covered. The panels thus coated are heated in an oven for 10 minutes at 120° C. to lightly cross-link the polymer, thereby forming a primer release coating.

The panels are conditioned for 24 hours at 22° C. and 45 percent relative humidity. Two panels (Panels A and B) are sprayed with a water based automobile paint until approximately 99.9 percent of the primer release coating is covered with the paint to a thickness from about 0.025 to about 0.05 millimeter. The other two panels (Panels C and D) are immersed in a tank holding the same water based automobile paint until the primer release coating is completely covered with paint to a thickness from about 0.038 to about 0.075 millimeter. The paint on each panel is dried at 30° C. for 24 hours.

Panels A and C are immersed in excessive amounts of water by dipping them in a tank containing water at ambient temperatures. The primer release coating on Panel A is found to absorb water rapidly with coincident swelling. Coincident with this absorption and swelling of the primer release the paint is loosened from the metal panel. The paint is completely removed therefrom by gravitational forces.

Panel C does not exhibit this rapid absorption and swelling, and after being immersed for 15 minutes essentially none of the paint has been loosened from the panel. At this time, the panel is removed and the paint scratched through to the primer release coating. Scratches are provided until about 0.5 percent of the surface area of the primer release coating is exposed. Upon immersion, the complete loosening of paint from Panel C requires an additional 10 minutes.

Panels B and D are sprayed with excessive amounts of cold water, i.e., 25° C. from a 1.92 centimeter diameter hose at 2.7 Kg/cm² pressure. The spray is continued for 10 minutes at which time all the paint has been removed from Panel B. Very little of the paint is removed from Panel D at this time. Therefore, the paint on Panel D is scratched through to the primer release coating in several places such that about 0.5 percent of the surface area of the primer release coating is exposed. Spraying of Panel D is continued until all the paint is removed therefrom. This is found to require an additional 10 minutes.

Thus, the method of this invention for removing paint is found to be effective.

EXAMPLE 2

Following the procedure of Example 1, a cross-linkable polymer composition having the following ingredients:

|  | Parts dry weight | Parts wet weight |
|---|---|---|
| Preparation I | 93 | 360.5 |
| Polyoxyethylene sorbitan mono laurate | 5 | 5.0 |
| Polycup 172 | 2 | 48 |
| Water | — | 321.5 | is prepared in a manner identical to Example 1. The test procedure of Example 1 is repeated and the results are essentially the same as those obtained therein.

Thus, the method of this invention for removing paint is found to be effective.

EXAMPLE 3

A cross-linkable polymer composition similar to the one employed in Example 1 is applied to a floor grate at ambient temperature, i.e., 25° C. The cross-linkable polymer is allowed to dry for 3 hours at 25° C. After drying, the grate is sprayed with a water based automobile paint until the equivalent of ten coats of such paint are applied to the top portion of the grate. The grate is then placed in an oven for 30 minutes at 120° C. and then the grate is allowed to cool. The cooled grate is immersed in a tank containing water.

Within 1 to 2 minutes, the paint loosens from the grate's surface where the paint thickness is thin, i.e., on the sides of the heavy metal strips comprising the grate. On the top of the grate where the paint deposits are thickest, the paint continues to adhere tightly during the first 1 to 2 minutes of immersion. These portions are scratched through to the primer release coating exposing about 0.5 percent of the coatings total surface area. Following this scratching, the paint is found to be loosened from the grate's surface and within about 10 minutes, all paint is loosened from the grate. The paint is easily removed thereafter by washing with a stream of water exiting from a 1.92 centimeter diameter hose at 2.7 Kg/cm² pressure.

The method of this invention is thus found effective for removing paint from a substrate.

EXAMPLE 4

Paint is removed from a floor grate following the method of Example 3, except that the paint on the floor grate is allowed to dry for 3 days at ambient temperatures rather than being dried in an oven.

Paint is loosened on the heavy metal strips, i.e., where the paint deposits are the thinnest, within 1 to 2 minutes. At this time, the paint is scratched through to the primer release coating at the top of the grate, i.e., where paint is the thickest, to expose about 0.5 percent of the total surface area of the primer release coating. The paint is found to be completely loosened on the substrate within 10 minutes following this scratching.

What is claimed is:

1. A method of removing depositions of hydrophobic material from a substrate comprising the steps of:
   (a) applying a primer release coating of a water-insoluble, water-swellable polymer to the substrate,
   (b) depositing the hydrophobic material on the primer release coating,
   (c) loosening the hydrophobic material by exposing the primer release coating to excessive amounts of an aqueous liquid, and
   (d) removing the hydrophobic material from the substrate.

2. The method of claim 1 wherein the water-insoluble, water-swellable polymer is a lightly cross-linked polymer.

3. The method of claim 2 wherein the primer release coating has a thickness between about 0.002 and about 0.25 millimeter.

4. The method of claim 3 wherein after deposition of the hydrophobic material at least 0.1 percent of the total surface area of the primer release coating is exposed to the water.

5. The method of claim 4 wherein the lightly cross-linked polymer is selected from the group consisting of lightly cross-linked polyacrylates; polyvinylpyrrolidones; sulfonated polystyrenes; sulfonated polyvinyl toluenes; polysulfoethyl acrylate; poly-2-hydroxyethyl acrylate; hydrolyzed polyacrylamides; copolymers of acrylamides with acrylic acid; polyvinyl morpholinone; amides and alkali metal or ammonium salts derived from copolymers of maleic anhydride with vinyl methylether, with vinyl-pyrrolidone, with vinyl morpholinone or with monoolefinic hydrocarbons; polymers and copolymers of acrolein modified by the reaction with an alkali metal hydroxide or alkali metal bisulfite and copolymers of sulfur dioxide with allyl alcohol, allyl ether or glycerol or allyl ether of ethylene glycol or a polyethylene glycol.

6. The method of claim 5 wherein the lightly cross-linked polymer is derived from a cross-linkable polyacrylate solution prepared by (A) saponifying an aqueous solution comprising (1) between about 30 to about 70 weight percent of a polyacrylate comprising (a) from about 20 to about 92 weight percent of an alkyl acrylate having 1-10 carbon atoms in the alkyl group or an alkyl methacrylate having 4-10 carbon atoms in the alkyl group, or mixtures thereof, (b) about 3 to about 70 percent of an olefinically unsaturated carboxylic acid, and (c) about 0 to about 15 percent of an omega hydroxyalkyl acrylate having 1-4 carbon atoms in the hydroxyalkyl group; and (2) an alkali metal hydroxide, at a concentration sufficient to saponify some of the acrylate esters and to neutralize the carboxylic acid groups, and (B) adding to the saponified mixture from about 0.1 to about 10 weight percent based on dissolved polymer of a cross-linking agent which is reactive with carboxylate salt groups.

7. The method of claim 1 wherein the aqueous liquid is water.

8. The method of claim 1 wherein the hydrophobic material deposited on the primer release coating is capable of being loosened by exposing said coating to excesive amounts of water.

* * * * *